(12) United States Patent
Barney (10) Patent No.: US 7,949,581 B2
(45) Date of Patent: May 24, 2011

(54) METHOD OF DETERMINING AN OBSOLESCENCE RATE OF A TECHNOLOGY

(75) Inventor: Jonathan A. Barney, Newport Beach, CA (US)

(73) Assignee: PatentRatings, LLC, Irvine, CA (US)

( * ) Notice: Subject to any disclaimer, the term of this patent is extended or adjusted under 35 U.S.C. 154(b) by 0 days.

(21) Appl. No.: 11/517,067

(22) Filed: Sep. 7, 2006

(65) Prior Publication Data

US 2007/0094297 A1    Apr. 26, 2007

Related U.S. Application Data

(60) Provisional application No. 60/714,713, filed on Sep. 7, 2005.

(51) Int. Cl.
*G06Q 40/00* (2006.01)
(52) U.S. Cl. .................................. 705/35; 705/36 R
(58) Field of Classification Search .............. 705/1, 10, 705/35, 36 R
See application file for complete search history.

(56) References Cited

U.S. PATENT DOCUMENTS

| | | |
|---|---|---|
| 4,991,087 A | 2/1991 | Burkowski et al. |
| 5,175,681 A | 12/1992 | Iwai et al. |
| 5,392,390 A | 2/1995 | Crozier |
| 5,544,302 A | 8/1996 | Nguyen |
| 5,546,529 A | 8/1996 | Bowers et al. |
| 5,576,954 A | 11/1996 | Driscoll |
| 5,594,897 A | 1/1997 | Goffman |
| 5,608,620 A | 3/1997 | Lundgren |
| 5,615,362 A | 3/1997 | Jensen et al. |
| 5,625,814 A | 4/1997 | Luciw |
| 5,640,553 A | 6/1997 | Schultz |
| 5,642,502 A | 6/1997 | Driscoll |
| 5,680,305 A | 10/1997 | Apgar, IV |
| 5,694,592 A | 12/1997 | Driscoll |
| 5,721,903 A | 2/1998 | Anand |
| 5,754,840 A | 5/1998 | Rivette et al. |
| 5,764,058 A * | 6/1998 | Itskovich et al. ............. 324/303 |
| 5,774,833 A | 6/1998 | Newman |
| 5,778,362 A | 7/1998 | Deerwester |
| 5,781,773 A | 7/1998 | Vanderpool et al. |

(Continued)

FOREIGN PATENT DOCUMENTS

EP    1 215 599    6/2002

(Continued)

OTHER PUBLICATIONS

"Strategic Alliances and Interfirm Knowledge Transfer", by Mowery, Oxley and Silverman, Strategic Management Journal, Winter 1996, pp. 77-91 (16 page stotal).*

(Continued)

*Primary Examiner* — James P Trammell
*Assistant Examiner* — Behrang Badii
(74) *Attorney, Agent, or Firm* — Knobbe, Martens, Olson & Bear LLP (57) ABSTRACT

Methods for constructing an estimated depreciated schedule for a patent are disclosed. The steps for constructing this schedule may include: (1) determining a first function which approximately describes the rate of initial increase in expected forward patent citations over time; (2) determining a second function which approximately describes the rate of eventual decay in expected forward patent citations over time; and (3) constructing an estimated depreciation schedule using a calculated decay coefficient derived from said second function.

8 Claims, 3 Drawing Sheets

U.S. PATENT DOCUMENTS

| | | | |
|---|---|---|---|
| 5,794,236 A | 8/1998 | Mehrle | |
| 5,799,325 A | 8/1998 | Rivette et al. | |
| 5,802,501 A * | 9/1998 | Graff | 705/36 R |
| 5,808,615 A | 9/1998 | Hill et al. | |
| 5,848,409 A | 12/1998 | Ahn | |
| 5,893,092 A | 4/1999 | Driscoll | |
| 5,926,811 A | 7/1999 | Miller et al. | |
| 5,930,784 A | 7/1999 | Hendrickson | |
| 5,937,402 A | 8/1999 | Pandit | |
| 5,991,751 A | 11/1999 | Rivette et al. | |
| 5,999,907 A | 12/1999 | Donner | |
| 6,009,436 A | 12/1999 | Motoyama et al. | |
| 6,014,663 A | 1/2000 | Rivette et al. | |
| 6,018,714 A | 1/2000 | Risen, Jr. et al. | |
| 6,018,749 A | 1/2000 | Rivette et al. | |
| 6,038,561 A | 3/2000 | Snyder et al. | |
| 6,038,574 A | 3/2000 | Pitkow et al. | |
| 6,049,811 A | 4/2000 | Petruzzi et al. | |
| 6,088,692 A | 7/2000 | Driscoll | |
| 6,108,651 A | 8/2000 | Guha | |
| 6,154,725 A | 11/2000 | Donner | |
| 6,175,824 B1 | 1/2001 | Breitzman et al. | |
| 6,182,091 B1 | 1/2001 | Pitkow et al. | |
| 6,202,058 B1 | 3/2001 | Rose et al. | |
| 6,212,530 B1 | 4/2001 | Kadlec | |
| 6,216,134 B1 | 4/2001 | Heckerman et al. | |
| 6,263,314 B1 | 7/2001 | Donner | |
| 6,285,999 B1 | 9/2001 | Page | |
| 6,286,018 B1 | 9/2001 | Pitkow et al. | |
| 6,289,342 B1 | 9/2001 | Lawrence et al. | |
| 6,298,327 B1 | 10/2001 | Hunter et al. | |
| 6,330,547 B1 | 12/2001 | Martin | |
| 6,339,767 B1 | 1/2002 | Rivette et al. | |
| 6,363,373 B1 | 3/2002 | Steinkraus | |
| 6,389,418 B1 | 5/2002 | Boyack et al. | |
| 6,389,436 B1 | 5/2002 | Chalrabarti et al. | |
| 6,421,066 B1 | 7/2002 | Sivan | |
| 6,452,613 B1 | 9/2002 | Lefebvre et al. | |
| 6,453,315 B1 | 9/2002 | Weissman et al. | |
| 6,457,028 B1 | 9/2002 | Pitkow et al. | |
| 6,463,431 B1 | 10/2002 | Schmitt | |
| 6,490,548 B1 | 12/2002 | Engel | |
| 6,526,440 B1 | 2/2003 | Bharat | |
| 6,556,992 B1 | 4/2003 | Barney et al. | |
| 6,560,600 B1 | 5/2003 | Broder | |
| 6,571,241 B1 | 5/2003 | Nosohara | |
| 6,574,632 B2 | 6/2003 | Fox et al. | |
| 6,587,850 B2 | 7/2003 | Zhai | |
| 6,591,261 B1 | 7/2003 | Arthurs | |
| 6,654,767 B2 | 11/2003 | McAnaney et al. | |
| 6,662,178 B2 | 12/2003 | Lee | |
| 6,665,656 B1 | 12/2003 | Carter | |
| 6,665,670 B2 | 12/2003 | Winer et al. | |
| 6,694,331 B2 | 2/2004 | Lee | |
| 6,751,613 B1 | 6/2004 | Lee et al. | |
| 6,754,873 B1 | 6/2004 | Law et al. | |
| 6,829,603 B1 | 12/2004 | Chai et al. | |
| 6,832,211 B1 | 12/2004 | Thomas et al. | |
| 6,862,579 B2 * | 3/2005 | Mathews et al. | 705/36 R |
| 6,879,990 B1 | 4/2005 | Boyer et al. | |
| 6,940,509 B1 | 9/2005 | Crow et al. | |
| 6,996,273 B2 | 2/2006 | Mihcak et al. | |
| 7,054,856 B2 | 5/2006 | Won et al. | |
| 7,089,192 B2 | 8/2006 | Bracchita et al. | |
| 7,092,961 B2 | 8/2006 | Minezaki et al. | |
| 7,099,876 B1 | 8/2006 | Hetherington et al. | |
| 7,106,329 B1 | 9/2006 | Miller et al. | |
| 7,111,002 B2 | 9/2006 | Zhang et al. | |
| 7,188,069 B2 * | 3/2007 | Hagelin | 705/1 |
| 7,194,490 B2 | 3/2007 | Zee | |
| 7,216,100 B2 | 5/2007 | Elliot | |
| 7,228,288 B2 | 6/2007 | Elliot | |
| 7,242,217 B2 | 7/2007 | Van Wageningen et al. | |
| 7,269,566 B2 * | 9/2007 | Elliott | 705/1 |
| 7,292,994 B2 | 11/2007 | Prokoski | |
| 7,320,000 B2 | 1/2008 | Chitrapura | |
| 7,331,016 B2 | 2/2008 | Williams et al. | |
| 7,433,884 B2 | 10/2008 | Breitzman | |
| 7,536,312 B2 | 5/2009 | Block | |
| 7,546,265 B1 | 6/2009 | Donner | |
| 7,558,749 B2 | 7/2009 | Chen | |
| 7,606,757 B1 | 10/2009 | Poltorak | |
| 2002/0002524 A1 | 1/2002 | Kossovsky et al. | |
| 2002/0004775 A1 | 1/2002 | Kossovsky et al. | |
| 2002/0022974 A1 | 2/2002 | Lindh | |
| 2002/0035499 A1 * | 3/2002 | Germeraad et al. | 705/9 |
| 2002/0046038 A1 | 4/2002 | Prokoski | |
| 2002/0077835 A1 | 6/2002 | Hagelin | |
| 2002/0082778 A1 | 6/2002 | Barnett et al. | |
| 2002/0087442 A1 | 7/2002 | Reader | |
| 2002/0099637 A1 * | 7/2002 | Wilkinson et al. | 705/36 |
| 2002/0099638 A1 | 7/2002 | Coffman et al. | |
| 2003/0036945 A1 | 2/2003 | Del Vecchio et al. | |
| 2003/0065658 A1 | 4/2003 | Matsubayashi et al. | |
| 2003/0078870 A1 * | 4/2003 | Datar et al. | 705/36 |
| 2003/0126054 A1 * | 7/2003 | Purcell, Jr. | 705/36 |
| 2003/0212572 A1 * | 11/2003 | Poltorak | 705/1 |
| 2003/0217113 A1 * | 11/2003 | Katz et al. | 709/213 |
| 2004/0010393 A1 * | 1/2004 | Barney | 702/181 |
| 2004/0103112 A1 | 5/2004 | Colson et al. | |
| 2005/0021434 A1 | 1/2005 | D'Loren | |
| 2005/0071174 A1 | 3/2005 | Leibowitz et al. | |
| 2005/0083850 A1 * | 4/2005 | Sin et al. | 370/252 |
| 2005/0149420 A1 | 7/2005 | Hagelin | |
| 2006/0036452 A1 | 2/2006 | Williams | |
| 2006/0036453 A1 | 2/2006 | Williams | |
| 2006/0036529 A1 | 2/2006 | Williams | |
| 2006/0036632 A1 | 2/2006 | Williams | |
| 2006/0036635 A1 | 2/2006 | Williams | |
| 2006/0074867 A1 * | 4/2006 | Breitzman | 707/3 |
| 2006/0122849 A1 * | 6/2006 | Masuyama et al. | 705/1 |
| 2006/0218056 A1 * | 9/2006 | Dickman | 705/28 |
| 2006/0224972 A1 * | 10/2006 | Albrecht et al. | 715/760 |
| 2007/0073625 A1 * | 3/2007 | Shelton | 705/59 |
| 2007/0073748 A1 | 3/2007 | Barney | |
| 2007/0088738 A1 | 4/2007 | Barney et al. | |
| 2007/0094297 A1 | 4/2007 | Barney | |
| 2007/0150298 A1 | 6/2007 | Barney | |
| 2007/0208669 A1 | 9/2007 | Rivette et al. | |
| 2008/0091620 A1 | 4/2008 | Vollenweider et al. | |
| 2008/0147541 A1 * | 6/2008 | Jones | 705/39 |

FOREIGN PATENT DOCUMENTS

| | | |
|---|---|---|
| WO | WO 00/75851 | 12/2000 |
| WO | WO 01/35277 | 5/2001 |

OTHER PUBLICATIONS

Thomas, Patrick "The Effect of Technological Impact upon Patent Renewal Decisions", Technology Analysis & Strategic Management, 11:2, 181-197, 1999, as downloaded on Dec. 2, 2009.

Lanjouw, et al., "The Quality Of Ideas: Measuring Innovation With Multiple Indicators", NBER Working Paper Series, Working Paper 7345, http://www.nber.org/papers/w7345, National Bureau of Economic Research, Sep. 1999.

Jean Olson Lanjouw and Mark Schankerman, "Stylised Fact of Patent Litigation: Value, Scope and Ownership", Jan. 1998, LSE STICERD Research Paper No. EI 20, http://sticerd.lse.ac.uk/dps/ei/ei20.pdf.

Joshua Lerner, "The Importance of Patent Scope: An Empirical Analysis", The RAND Journal of Economics, vol. 25, No. 2 (Summer, 1994), pp. 319-333, http://www.jstor.org/stable/2555833.

Dietmar Harhoff, Frederic M. Scherer, Katrin Vopel, "Citations, Family Size, Opposition and the Value of Patent Rights", Sep. 1999.

Email communications regarding the possible publication date of "The Quality of Ideas: Measuring Innovation With Multiple Indicators" reference (w7345).

Yao Li, "Borders and Distance in Knowledge Flows: Dying Over Time or Dying With Age?—Evidence From Patent Citations", CESifo Area Conference on Global Economy, Jan. 25-26, 2008.

Rufus Pollock, "Exploring Patterns of Knowledge Production", University of Cambridge, May 2009.

Elizabeth A. Leicht, "Methods and Applications for Detecting Structure in Complex Networks", A Dissertation Submitted in Partial Fulfillment of the Requirements for the Degree of Philosophy (Physics) in the University of Michigan 2008.

Csardi et al., "Modeling innovation by a kinetic description of the patent citation system", Article in Press, ScienceDirect, Apr. 4, 2006.

Ariel Pakes, "Patents As Options: Some Estimates of the Value of Holding European Patent Stocks", NBER Working Paper Series, Working Paper 1340, National Bureau of Economic Research, Apr. 1984.

Katherine J. Strandburg, "Kinetics of the Patent Citation Network: A Physics Approach to Understanding the Patent System", DePaul University College of Law and University of Illinois College of Law (visiting Fall 2005).

Dietmar Harhoff, Francis Narin, Frederic M. Scherer, Katrin Vopel, "Citations Frequency and the Value of Patented Innovation", Nov. 1997.

Dietmar Harhoff, Frederic M. Scherer, Katrin Vopel, "Citations Frequency and the Value of Patented Inventions", Aug. 1999.

Gregory P. Daines, "Patent Citations and Licensing Value", Submitted to the Sloan School of Management in Partial Fulfillment of the Requirements for the Degree of Master of Business Administration at the Massachusetts Institute of Technology, Jun. 2007.

Jean Olson Lanjouw and Mark Schankerman, "Stylised Fact of Patent Litigation: Value, Scope and Ownership", The Toyota Centre, Jan. 1998.

U.S. Patent and Trademark Office, Board of Patent Appeals and Interferences. Ex parts Donnor. No. 96-2552, Decided Mar. 26, 1999. 53 USPQ2d, pp. 1699-1702.

Barron, Russell J. "Better Accounting for Patent Portfolios" Legal Times. Oct. 16, 2000. pp. 91-92.

Los Angeles Times, "Marketplace of Ideas: Selling Patents Online." Oct. 25, 1999, Section C.

Malki, Elli "Intellectual Property and the Valuation of Biotechnology Companies: GEN-dex versus Dow Jones." 1997.

Malki, Elli. "Intellectual Property Intensity (IPI) and the Value-Growth Effect." Nov. 12, 1997.

Jaffe, Adam B., et al., "International Knowledge Flows: Evidence from Patent Citations." National Bureau of Economic Research. Cambridge, MA. Apr. 1998.

Lanjouw, Jean O., et al. "The Enforcement of Intellectual Property Rights: A survey of the Empirical Literature." National Bureau of Economic Research. Cambridge, MA. Dec. 1997.

Khan, B. Zorina. "Legal Monopoly: Patents and Antitrust Litiation in U.S. Manufacturing, 1970-1998." National Bureau of Economic Research Cambridge, MA Apr. 1999.

Cockburn, Iain, et al., "Industry Effects and Appropriability Measures in the Stock Market's Valuation of R&D and Patents," National Bureau of Economic Research. Cambridge, MA. Dec. 1987.

Hall, Bronwyn H. "Innovation and Market Value." National Bureau of Economic Research, Cambridge, MA. Feb. 1999.

"Value Relevance of Nonfinancial Information: The Case of Patent Data." Nov. 2001.

"Empirical Evidence of Patent Validity," AIPLA Quarterly Journal, vol. 28: 185. pp. 187-275. 1998.

Bramson, Robert S. "Valuing Patents, Technologies and Portfolios: Rules of Thumb." Website: www.ventius.com May 1, 2000.

Trippe, Anthony. "Software Tools for Analyzing Patents," Website: www.tripp.EPSILON.go-concepts.com. Apr. 1999.

Rivette, Kevin G., et al. "Discovering New Value in Intellecutual Property." Harvard Business Review. Jan.-Feb. 2000.

Hall, Bronwyn H "Market Value and Patent Citations: A First Look" May 2001.

Multiple Regression http://www.2.chase.ncsu.edu/garson/pa765/regress.htm Dec. 13, 2001.

Survey on Solutions to Prior Art Searching Internet Patent News Service Jun. 30, 1999.

Reifeld, Richard A., "A Macro-economic Model Providing Patent Valuation and Patent Based Company Financial Indicators," 83 J. Pat. & Trademark Off. Xoc'y 211(Mar. 2001).

Freewing Aerial Robotics Corporation Determination of Fair Market Value Jun. 1, 1997.

"Bond Rating," Printout from unknown website. 1997.

Aurigin Systems, Inc. Aureka Cite Module 1998.

"Patent Claim Analysis." Site Hawk Date Unknown.

McGavock, Daniel M. Of IPC Group, Inc. "Assessing the Value of your Client's Intellectual Property Rights for Licensing, Sale or Litigation." Presentation for Knobbe, Martens, Olson & Bear, LLP. Sep. 27, 1999.

"Patent Cafe Website of Satisfy the Inventor's Heartlest Appetite," Desert Maller News. Sep. 21, 1999.

"The Open Platform for Intellectual Property Asset Management" Aurgin products pamphlet for Aureka 7.0 software. 1999.

Willigan, Walter L "Leveraging Your Intellectual Property: A Proved Path to Value Extraction" Dec. 1998.

"Calculation of Indicated Market Value" TRRU IP Valuation Report Dec. 14, 2000.

Patent Evaluation Index, The Japan Technomark Foundation (Mar. 2000).

Heiden, Bowman J., "The Microeconomic Asset Value of a Patent: An Empiracle Study of Highly valuable Swedish-owned Patents," Center for Intellectual Property Studies Dept. of Industrial Management & Economics, Chalmers University of Technology (Apr. 2001).

United States Patent & Trademark Office, FY 2000 USPTO Annual Report.

American Intellectual Property Law Association, Report of Economic Survey, pp. 63-63 (1999).

Smith & Par, Valuation of Intellectual Property and Intangible Assets, 2nd Ed. (1989).

S. Benninga, Financial Modeling, 2nd Ed., MIT Press (2000).

Savikas, "Survey Lets Judges Render Some Opinions About the Patent Bar," Nat'l L.J., Jan. 18, 1993, at 57.

AIPLA., "Report of Economic Survey" (1991).

"The Anatomy of Large-Scale Hypertextual Search Engine," by Sergey Brin and Lawrence Page.

Mark A. Lemley, et al., Valuable Patents, 92 Georgetown Law Journal 435 (2004).

S.A. Solla, T.K. Leen, and K.R. Muller's "Learning the Similarity of Documents: An Information-Geometric Approach to Document Retrieval and Categorization," ANIPS, v. 12, pp. 914-920, MIT Press, 2000.

"Intellectual Property," Website: www.edtn.com. Feb. 15, 1999.

Grilliches, Zvi. "Patent Statistics as Economic Indicators: A Survey Part I." National Bureau of Economic Research. Cambridge, MA. Mar. 1990.

Lanjouw, Jean O., et al. "How to Count Patents and Value Intellectual Property: Uses of Patent Renewal and Application Data." National Bureau of Economic Research. Cambridge, MA. Jul. 1996.

Lanjouw, Jean O., et al. "Stylized Facts of Patent Ligation." National Bureau of Economic Research. Cambridge, MA. Oct. 1999.

Reitzig, Markus "Improving Patent Valuation Methods for Management Validating Indicators by Understanding Patenting Strategies" Oct. 2001.

Schankerman, M. and A. Pakes "Estimates of the Value of Patent Rights in European Countries During the Post-1950 Period", NBER Working Paper No. 1650, Jun. 1985.

Van der Drift, J. "Statistics of European Patents on Legal Status and Granting Data", World Patent Information, vol. 10, No. 4, May 3-5, 1988, pp. 243-249.

Trajtenberg, M. "A Penny for Your Quotes: Patent Citations and the Value of Innovations", RAND Journal of Economics, vol. 21, No. 1, Spring 1990, pp. 172-181.

Albert, M.B., D. Avery, F. Narin and P. McAllister "Direct Validation of Citation Counts as Indicators of Industrially Important Patents", Research Policy, vol. 20, 1991, pp. 251-259.

Putnam, J.D. "The Value of International Patent Rights", Ph.D. disseration, Yale University, May 1996.

Harhoff, D., F. Narin, F.M. Scherer and K. Vopel "Citation Frequency and the Value of Patented Innovation", Discussion paper 97-27, Aug. 1997.

Pitkethly, R. "The Valuation of Patents: A Review of Patent Valuation Methods with Consideration of Option Based Methods and the Potential for Further Research", Judge Institute Working Paper WP Dec. 1997.

Allison, J.R. and M.A. Lemley "Empirical Evidence on the Validity of Litigated Patents", Jul. 1998. Available at SSRN: http://ssrn.com/abstract=118149 or DOI: 10.2139/ssrn. 118149.

Narin, F. "Tech-Line Background Paper", CHI Research, Inc., Aug. 19, 1998.

Deng, Z., B. Lev and F. Narin "Science and Technology as Predictors of Stock Performance", Financial Analysis Journal, vol. 55, No. 3, May/Jun. 1999, pp. 20-32.

Kohonen, T., S. Kaski, K. Lagus, J. Salojarvi, J. Honkela, V. Paatero and A. Saarela "Self Organization of a Massive Document Collection", IEEE Transactions of Neural Networks, vol. 11, No. 3, May 2000, pp. 574-585.

Neifeld, R.A. "A Macro-Economic Model Providing Patent Valuation and Patent Based Company Financial Indicators", JPTOS vol. 83, No. 3, Mar. 2001, pp. 211-222.

Lanjouw, J.O. and M. Schankerman "Characteristics of Patent Litigation: A Window on Competition", RAND Journal of Economics, vol. 32, No. 1, Spring 2001, pp. 129-151.

Barney, J.A. "A Study Patent Mortality Rates: Using Statistical Survival Analysis to Rate and Value Patent Assets", AIPLA Quarterly Journal, vol. 30, No. 3, pp. 317-352.

Kim, A.D., N.W. Partee, T.J. Reynolds and M.A. Santamaria "Patent Litigation Risk-Scoring Model", Proceedings of the 2002 IEEE Systems and Information Design Symposium, 2002, pp. 13-17.

Winkless, B., B. O'Connor and J. Cooney "Invention Quality Measurement (IQM) 1. Patent Valuation: The Methods that TRIZ Forgot". The TRIZ Journal, downloaded from www.triz-journal.com, Sep. 2003.

Allison, J.R., M.A. Lemley, K.A. Moore and R.D. Trunkey "Valuable Patents", Boalt Working Papers in Public law, Paper 28, 2003.

Neifeld, R.A. "Patent Valuation from a Practical View Poin, and Some Interesting Patent Value Statistics from the PatentValuePredictor Model", PatentCafe Magazine, downloaded from www.PatentCafe.com, Apr. 14, 2004.

Buchanan, J.M. "Patent Rankings: The Numbers Game v. Patent Quality", blog post, downloaded from www.rethinkip.com, Apr. 20, 2005.

* cited by examiner

| StartValue | 1.65369 | | Peer Group: | Patent Space |
|---|---|---|---|---|
| DecayConst | -0.09954 | | Decay Rate: | -9.95% |
| LogMean | 1.07405 | | Half-Life: | 6.96 |
| LogStdev | 0.45549 | | RSQ: | 0.996 |
| Error^2 | 13.1 | | | |
| Max Cites | 4230 | | | |
| Half-Life | 6.96384 | | | |
| RSQ | 0.996132981 | | | |

| Age of Cited | #Fwd Cites | Fwd Cite Rat | Ramp Up | Decay | Obsolesence | Error^2 |
|---|---|---|---|---|---|---|
| 0 | 83 | 0.01962175 | 0.00918716 | 1.653688382 | 0.015192704 | 0.019616447 |
| 1 | 1399 | 0.33073286 | 0.20151005 | 1.497014717 | 0.301663512 | 0.845027018 |
| 2 | 2831 | 0.66926714 | 0.5215028 | 1.355184622 | 0.706732569 | 1.403658418 |
| 3 | 3893 | 0.92033097 | 0.75348828 | 1.226791786 | 0.924373233 | 0.016339892 |
| 4 | 4230 | 1 | 0.88008289 | 1.110563138 | 0.977387617 | 0.511319855 |
| 5 | 4146 | 0.98014184 | 0.94244944 | 1.005346219 | 0.947487977 | 1.066274999 |
| 6 | 3793 | 0.89669031 | 0.97219621 | 0.910097757 | 0.884793586 | 0.141531971 |
| 7 | 3444 | 0.8141844 | 0.98635189 | 0.823873319 | 0.812629009 | 0.002419231 |
| 8 | 3075 | 0.72695035 | 0.99316535 | 0.745817953 | 0.740720551 | 0.189618297 |
| 9 | 2921 | 0.69054374 | 0.9965032 | 0.675157705 | 0.672796813 | 0.314953234 |
| 10 | 2528 | 0.59763593 | 0.9981719 | 0.611191946 | 0.610074626 | 0.154721061 |
| 11 | 2272 | 0.53711584 | 0.99902394 | 0.553286429 | 0.552746386 | 0.244314005 |
| 12 | 2063 | 0.48770686 | 0.99946822 | 0.500866993 | 0.50060064 | 0.166249663 |
| 13 | 1848 | 0.43687943 | 0.99970465 | 0.453413876 | 0.453279959 | 0.268977267 |
| 14 | 1662 | 0.3929078 | 0.99983295 | 0.410456561 | 0.410387994 | 0.305557124 |
| 15 | 1534 | 0.36264775 | 0.99990388 | 0.371569105 | 0.37153339 | 0.078954531 |
| 16 | 1326 | 0.31347518 | 0.99994379 | 0.336365923 | 0.336347017 | 0.523121033 |
| 17 | 1212 | 0.28652482 | 0.99996663 | 0.304497959 | 0.304487797 | 0.322668437 |
| 18 | 1043 | 0.2465721 | 0.9999799 | 0.275649228 | 0.275643687 | 0.845156926 |
| 19 | 1015 | 0.23995272 | 0.99998772 | 0.249533683 | 0.249530619 | 0.091736184 |
| 20 | 934 | 0.22080378 | 0.99999241 | 0.225892374 | 0.22589066 | 0.025876318 |
| 21 | 815 | 0.19267139 | 0.99999525 | 0.20449089 | 0.204489918 | 0.139677498 |
| 22 | 777 | 0.18368794 | 0.99999699 | 0.185117024 | 0.185116467 | 0.00204068 |
| 23 | 732 | 0.17304965 | 0.99999807 | 0.167578676 | 0.167578353 | 0.029935038 |
| 24 | 681 | 0.16099291 | 0.99999875 | 0.151701945 | 0.151701756 | 0.086325498 |
| 25 | 644 | 0.15224586 | 0.99999919 | 0.137329407 | 0.137329295 | 0.222503993 |
| 26 | 566 | 0.13380615 | 0.99999946 | 0.124318551 | 0.124318484 | 0.090015737 |
| 27 | 582 | 0.13758865 | 0.99999964 | 0.112540369 | 0.112540329 | 0.627418528 |
| 28 | 518 | 0.12245863 | 0.99999976 | 0.101878075 | 0.10187805 | 0.423560216 |
| 29 | 467 | 0.11040189 | 0.99999984 | 0.092225947 | 0.092225932 | 0.330365491 |
| 30 | 405 | 0.09574468 | 0.99999989 | 0.083488281 | 0.083488272 | 0.150219567 |

FIG. 3

METHOD OF DETERMINING AN OBSOLESCENCE RATE OF A TECHNOLOGY

CROSS-REFERENCE TO RELATED APPLICATIONS

This application claims the benefit of U.S. Provisional Application No. 60/714,713, filed Sep. 7, 2005, the entirety of which is hereby incorporated by reference

BACKGROUND OF THE INVENTION

1. Field of the Invention

The present invention in various embodiments relates to assessing the value of assets.

2. Description of the Related Art

Patents play an important role in our economy in encouraging private investment in new ideas and the development of new technologies that improve productivity and quality of life for everyone. Each year more than a quarter-million patent applications are filed in the United States Patent and Trademark Office ("PTO"), resulting in the issuance of over a hundred fifty-thousand patents annually. Patent owners and applicants pay combined fees and costs of over a billion dollars per year to the PTO to obtain and maintain their patents and applications. See, United States Patent & Trademark Office, FY 2000 USPTO Annual Report. Additional fees and costs are typically incurred for related professional services, such as attorneys fees, search fees, drafting charges and the like.

A recent survey conducted by the American Intellectual Property Law Association ("AIPLA") reported that the median fees charged by law firms for preparing and filing original utility patent applications in 1999 ranged between $4,008 and $7,993, depending upon subject matter and complexity. See, American Intellectual Property Law Association, Report of Economic Survey, pp. 63-63 (1999). In addition, patent owners bring thousands of infringement suits each year in the federal courts. In the twelve months ending June 1998 a total of 1,996 patent-related cases were filed in the United States Federal District Courts. See, Annual Report of Judicial Statistics for 1997, Vol. 1, Civil Cases. The median cost of these suits in 1999 was estimated at $1.5 million per side through trial and appeal. It can be conservatively estimated that the total aggregate costs for obtaining, maintaining and enforcing patents in 1999 exceeded about $5.5 billion.

Because of the great importance of patents in the both the U.S. and global economies there has been continued interest in quantifying the value of patents and their contribution to economic prosperity of the individuals or companies that hold and/or control them. Such information can be useful for a variety of purposes. For example, patent holders themselves may be interested in using such information to help guide future decision-making or for purposes of tax treatment, transfer pricing or settlement of patent license disputes. Financial advisors and investors may seek to use such information for purposes of comparative value analysis and/or to construct measures of the "fundamental value" of publicly traded companies for purposes of evaluating possible strategic acquisitions or as a guide to investment. Economists may seek to use patent valuations for purposes of economic forecasting and planning. Insurance carriers may use such valuations to set insurance policy premiums and the like for insuring intangible assets. See, e.g., U.S. Pat. No. 6,018,714, incorporated herein by reference.

However, accurate valuing of patents and other intangible intellectual property assets is a highly difficult task requiring an understanding of a broad range of legal, technical and accounting disciplines. Intellectual property assets are rarely traded in open financial markets or sold at auction. They are intangible assets that secure unique benefits to the individuals or companies that hold them and/or exploit the underlying products or technology embodying the intellectual property. In the case of patent assets, for example, this unique value may manifest itself in higher profit margins for patented products, increased market power and/or enhanced image or reputation in the industry and/or among consumers or investors. These and other characteristics of intellectual property assets make such assets extremely difficult to value.

Patents derive unique value from the legal rights they secure, namely the right to exclude competition in the patented technology. This value (if any) usually manifests itself as a net increase in operating revenues resulting from either: (i) premium pricing of patented products or services; or (ii) royalty payments or other valuable consideration paid by competitors or other parties for use of the patented technology. Given these two inputs and the timing and probability of anticipated future revenue streams, an experienced valuation professional can readily estimate the value of a patent. See, Smith & Par, Valuation of Intellectual Property and Intangible Assets, 2nd Ed. (1989).

A familiar scenario is a patent licensed to a third party under an exclusive agreement that guarantees a predetermined income stream over a certain period of time. Using an income valuation approach, the intrinsic value of the licensed patent can be calculated simply as the net discounted present value of the future projected cash flows. Similarly, if the patent owner is exploiting the patented technology itself, the value of the patent may be fairly estimated as the net discounted present value of the incremental profit stream (assuming one can be identified) attributable to the patent over the remaining life of the patent or the economic life of the patented technology, whichever is shorter.

In these and similar scenarios where specific anticipated economic benefits can be identified and attributed to a particular intellectual property asset, accurate and credible estimations of value can be calculated using a traditional income valuation approach. In many cases, however, it is exceedingly difficult to identify with a desired degree of certainty a definite income stream or other anticipated economic benefit attributable to a particular intellectual property asset of interest. The classic example is a newly issued patent or an existing patent covering technology that, for whatever reason, has yet to be commercialized. In these and similar cases involving "unproven" patent assets the income valuation approach is less useful. The more tenuous the connection is between current revenues and anticipated future revenues, the more speculative the income valuation approach becomes.

For example, one popular approach involves guestimating "hypothetical" future license fees or royalties based on available data obtained from private license agreements and/or litigation settlements/awards involving patents in a similar technical field. While such analysis may be useful in certain cases, it suffers from several drawbacks that can lead to significant inaccuracies. One drawback is the inherent selection bias in the comparative data used to calculate hypothetical future license fees or royalties. By definition, all of the patents in the comparison group have been licensed, litigated and/or otherwise commercialized. This creates a "high-value" selection bias because most patents within the general population of patents are never licensed, litigated or commercialized at all. Thus, the approach will tend to over-value many patent assets. The approach also does not attempt to distinguish between similar patents based on underlying quality, breadth of claims, etc. Rather, the approach assumes that patents are fungible assets and that any one patent has essentially the same income earning potential as any other patent within the same field.

The reality is that every patent is unique. There are good patents and bad patents; broad patents and narrow patents; patents that are well-drafted and prosecuted and others that are not so well-drafted or prosecuted. Two patents in the same industry and relating to the same general subject matter can command drastically different royalty rates in a free market (or damage awards in litigation) depending upon subtle differences that affect the comparative breadth and defensibility of each patent.

Where there is enough money at stake, one or more patent lawyers can be engaged to analyze an individual patent and render a legal opinion, including an assessment of overall patent quality. But, such qualitative assessments are difficult to quantify in a way that lends itself to patent valuation analysis. Legal opinions are also inherently subjective, leaving the possibility for inconsistencies in assessed patent quality from attorney to attorney or from firm to firm.

What is needed is a purely objective approach for comparatively rating and valuing patents (particularly unproven patent assets) in a way that overcomes the above-noted problems and limitations.

SUMMARY OF THE INVENTION

Some embodiments of the invention include a method for constructing an estimated depreciation schedule for a patent. The steps for constructing this schedule may include: (1) determining a first function which approximately describes the rate of initial increase in expected forward patent citations over time; (2) determining a second function which approximately describes the rate of eventual decay in expected forward patent citations over time; and (3) constructing an estimated depreciation schedule using a calculated decay coefficient derived from said second function.

In some embodiments the first function comprises a lognormal probability distribution function. In some embodiments, the forward citation frequency is approximated by the product of the first and second functions.

BRIEF DESCRIPTION OF THE DRAWINGS

The accompanying drawings, which are incorporated in and constitute a part of this specification, illustrate several embodiments of the invention. Certain preferred embodiments and examples will now be described in detail having reference to the figures that follow, of which:

FIG. 1 also shows (the plot titled "Ramp Up & Decay") the fitted approximation.

FIG. 3 is an example of the calculations for determining the parameters (or coefficients) best defining the functions shown in FIG. 2.

DETAILED DESCRIPTION OF THE PREFERRED EMBODIMENT

In valuing a patent asset, a time-wise adjustment needs to be made in order to account for the effects of value depreciation over time. Depreciation of patent value over time may be caused by: (i) depletion of remaining patent term; and (ii) obsolescence over time of the underlying patented technology. A discussion on the valuation of patents can be found in U.S. Pat. No. 6,556,992, which is hereby incorporated herein by reference.

Term depletion depreciation accounts for loss of patent value due to exhausting the useful life of the patent. Every patent has a finite maximum term, averaging about 17.3 years. Depletion of patent term results in corresponding depletion of value because there is less time to extract the economic benefits of the patent and the underlying technology. This can generally be approximated as a straight line depreciation function over the expected patent term.

In addition to term depletion there is also loss of value due to age-related obsolescence of the underlying patented technology. In a licensing context, this can be thought of as time-wise diminishment or dilution of the "royalty base" caused by the introduction of new improvement patents that ultimately compete for the same royalty dollars. In some embodiments, the rate at which newer patents (and technology) replace older patents (and technology) is used as the rate of patent obsolescence.

In one embodiment, the average rate at which patents and technology become obsolete (e.g. replaced by newer technology and patents) assists in determining an appropriate patent depreciation schedule (i.e., how quickly a patent will lose value over time). Advantageously, the rate of patent obsolescence may also be used to formulate a patent filing and prosecution strategy and to set target benchmarks.

In some embodiments of the invention, the patent obsolescence rate is estimated by measuring the decline in the rate of forward citations of aging patents. As technological advances are made and as new patents are filed and issued, older patents gradually become less and less relevant to the newer patents that represent the latest, leading edge technology. This may be reflected by a declining rate of citations from newer patents to older patents. Eventually, older patents may cease receiving citations altogether as the older technologies gradually fade away and are replaced with newer technologies. This phenomenon is illustrated in FIG. 1 and FIG. 2.

Figure 1:
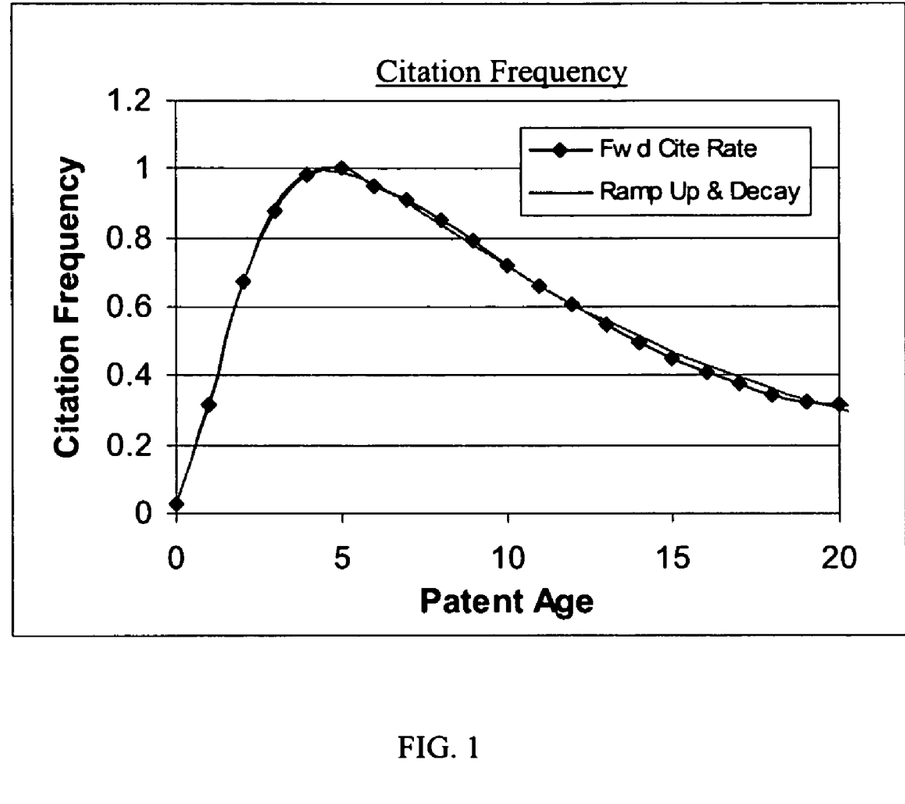
FIG. 1 is a graph that shows (the plot titled "Fwd Cite Rate," marked with diamonds) the average age of patents receiving forward citations within a selected peer group (X-axis) and the relative frequency of forward citations being generated currently by newly issued patents (Y-axis).
Figure 2:
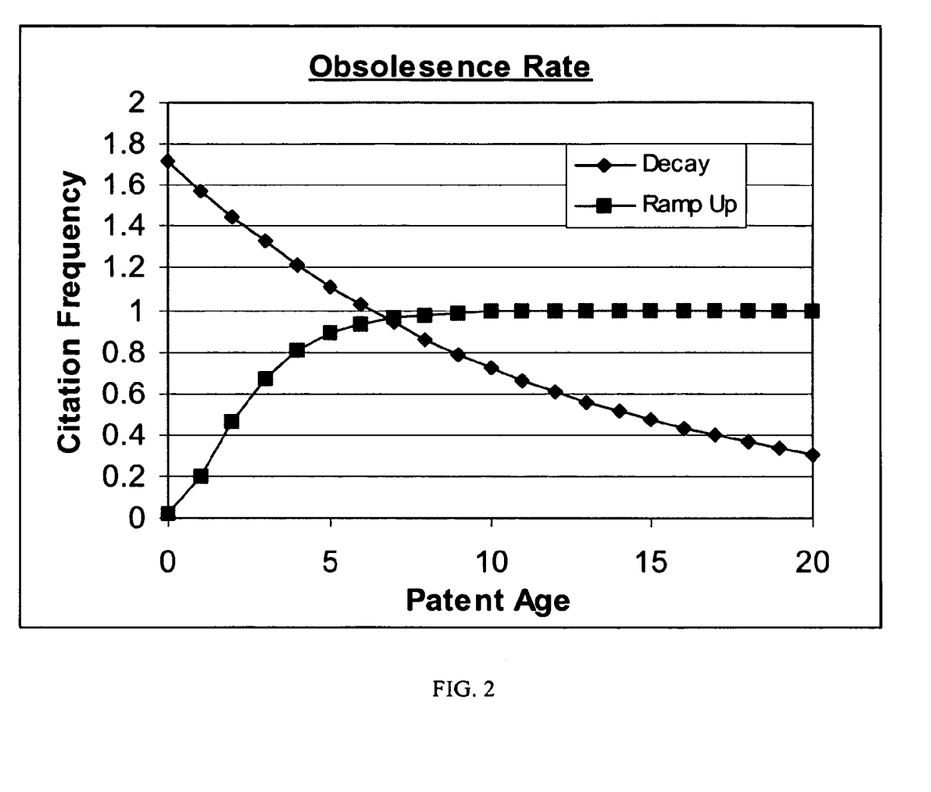
FIG. 2 is a graph that shows the product of the lognormal ramp-up function (the plot titled "Ramp Up," marked with squares) and the exponential decay function (the plot titled "Decay," marked with diamonds) to yield the fitted approximation in FIG. 1.

FIG. 1 (plot titled "Fwd Cite Rate" marked with diamonds) shows the average age of patents receiving forward citations within a selected peer group (X-axis) and the relative frequency of forward citations being generated currently by newly issued patents (Y-axis). In some embodiments, the initial 4-5 year ramp-up of forward citations reflects the lag time for cited patents to be issued and for awareness to grow. In some embodiments, this initial ramp-up follows a lognormal probability distribution curve with awareness growing from 0% initially and asymptotically approaching 100% over time (plot titled "Ramp Up" and marked with squares, FIG. 2). In one embodiment the initial ramp up approximately follows a lognormal probability distribution curve defined by the following equation:

$$P(cite) = LOGNORMDIST(AGE, LOGMEAN, LOGSTDV)$$

Where:

P(cite)=probability of citation

AGE=patent age in years=int(PatentAge)+1 or "Age of Cited+1"

LOGMEAN=log mean of the lognormal distribution
LOGSTDV=log standard deviation of the lognormal distribution In some embodiments of the invention, the decline in forward citation rates over time (the next 5-20 years) generally follows an exponential decay function. In some embodiments, FIG. 2 shows the exponential decay function as depicted by plot titled "Decay" and marked with diamonds. In one embodiment the decline in forward citation rates approximately follows an exponential decay function defined by the following equation:

FWDCITES(normalized)=STARTVALUE*EXP(AGE*DECAYRATE)

Where:

FWD CITES (normalized)=number of forward cites normalized as a percentage of the yearly maximum STARTVALUE=hypothetical initial start value of FWD CITES (normalized)

DECAYRATE=decay coefficient of the exponential decay function

In some embodiments, the actual observed forward citation frequency is closely approximated by the product of the lognormal ramp-up function (plot titled "Ramp Up" and marked with squares, FIG. 2) and the exponential decay function (titled "Decay" and marked with diamonds, FIG. 2) to yield the fitted approximation (plot titled "Ramp Up & Decay", FIG. 1). In some embodiments of the invention, the parameters (or coefficients) best defining each of these functions is iteratively determined to produce a best fit estimate of the observed citation frequency data. Preferably, the parameters (or coefficients) are solved or estimated simultaneously by using an iterative solver program such as the "Solver" add-on in the MS-Excel program.

One example of this calculation is provided in the table of FIG. 3.

The above calculation is merely an example and should not be construed to limit the scope of the invention. The square of the Pearson product moment correlation coefficient ("RSQ") in this case was equal to 0.996, indicating that the model provided a very good fit, as illustrated in FIG. 1 (compare the overlapping plots of the "Fwd Cite Rate" marked with diamonds and the "Ramp up & Decay").

In this case the exponent of the citation frequency decay function was iteratively determined to be −0.09954, indicating an average rate (or risk) of obsolescence of 9.95% per year. This corresponds to a technology half-life of 6.96 years. This suggests that the average utility or value of a patent selected from the peer group would decay to ½ of its original starting value after 6.96 years (ignoring the added effects of term depletion). In some embodiments, a technology's half-life is calculated by the following equation: $HALFLIFE = \ln(0.5)/DECAY\ RATE$.

The data included in the above example can be further described as follows:

| Column | Explanation |
| --- | --- |
| Age of Cited | This is the approximate age in integer years for each age-group of cited patents (Note: AGE = Age of Cited + 1) |
| #Fwd Cites | This is the actual count of cited patents for each age group |
| Fwd Cite Rate | This is the rate of cites normalized by dividing #Fwd Cites by the Max(#Fwd Cites) |
| Ramp Up | This is the result of the ramp up function |

-continued

| Column | Explanation |
| --- | --- |
| Decay | p(cite) at the given AGE value. This is the result of the exponential decay function at the given AGE value |
| Obsolescense | This is the product of (Ramp Up)*(Decay) - essentially, this is the "Fwd Cite Rate" as predicted by the model |
| Error^2 | This is the square of the actual Fwd Cite Rate minus the predicted Fwd Cite Rate |

The rate of patent obsolescence varies from technology to technology. Typically, faster-paced technologies, such as computer-electronics and software, decline more rapidly than slower-paced technologies, such as basic materials and simple mechanical technologies. Data on the obsolescence of a few exemplary US patent classifications resulting from one embodiment of the invention are provided below:

| Class | Description | Decay Rate | Half-Life | RSQ |
| --- | --- | --- | --- | --- |
| 370 | Multiplex communications | −26.8% | 2.590 | 0.998 |
| 361 | Electricity: electrical systems . . . | −15.1% | 4.610 | 0.997 |
| 556 | Organic compounds . . . | −13.8% | 5.030 | 0.981 |
| 237 | Heating systems | −7.6% | 9.090 | 0.95 |
| 181 | Acoustics | −6.6% | 10.480 | 0.976 |
| 28 | Textiles: manufacturing | −5.4% | 12.790 | 0.907 |
| 116 | Signals and indicators | −4.8% | 14.560 | 0.923 |
| 366 | Agitating | −4.7% | 14.670 | 0.98 |
| 105 | Railway rolling stock | −4.5% | 15.430 | 0.92 |

Some embodiments of the invention may provide all or some of the following advantages:

Provides an actual statistical measure of age-related obsolescence

Calculate patent depreciation schedules

Assess obsolecense "risk" for a single patent or a portfolio

Set target filing/prosecution rates to "replace" depleted patent assets

In some embodiments, it is contemplated that some or all of the steps described herein may be implemented within, or using, software modules (programs) that are executed by one or more general purpose computers. In these embodiments, the software modules may be stored on or within any suitable computer-readable medium. It should be understood that the various steps may alternatively be implemented in-whole or in-part within specially designed hardware.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A computer implemented method for generating a predicted depreciation schedule for a set of one or more patents, the computer implemented method comprising:

selecting via a computer system a set of one or more patents for which to generate the predicted depreciation schedule;

accessing via the computer system, from a data repository, forward citation frequency data related to the set of one or more patents;

generating via the computer system a lognormal probability distribution function for the set of one or more patents based at least partially on the forward citation frequency data for a selected period of time, the lognormal probability distribution function representing ramp up public awareness of the set of one or more patents, wherein the lognormal probability distribution function is iteratively generated to determine coefficients that produce a best fit estimate of the forward citation frequency data;

generating via the computer system an exponential decay function for the set of one or more patents based at least partially on the forward citation frequency data for a second period of time that is beyond the selected period of time, the exponential decay function representing obsolescence of the set of one or more patents, wherein the exponential decay function is iteratively generated to determine coefficients that produce a best fit estimate of the forward citation frequency data; and storing via the computer system the predicted depreciation schedule for the set of one or more patents, the predicted depreciation schedule comprising a combination of the lognormal probability distribution function and the exponential decay function, wherein the predicted depreciation schedule is correlated to a depreciation rate for the set of one or more patents.

2. The computer implemented method of claim 1, further comprising electronically determining whether to pay a patent maintenance fee for a selected patent based at least partially on determining the depreciation rate from the predicted depreciation schedule of the set of one or more patents for a selected time period.

3. A computer implemented method for constructing an estimated depreciation schedule for a patent, comprising:

electronically selecting a patent to generate the estimated depreciation schedule statistically correlated to expected forward citations to the patent;

electronically determining a first function which approximately describes a rate of initial increase in expected forward patent citations over time;

electronically determining a second function which approximately describes a rate of eventual decay in expected forward patent citations over time, the second function representing obsolescence of the patent;

electronically constructing the estimated depreciation schedule using a calculated decay coefficient derived from said first and second functions, wherein the estimated depreciation schedule is constructed by a computer system; and electronically storing in a data repository the estimated depreciation schedule.

4. The method of claim 3 wherein said first function comprises a lognormal probability distribution function.

5. A computer implemented method for generating a predicted depreciation schedule for a set of one or more unproven patent assets, the computer implemented method comprising:

selecting via a computer system a set of one or more patents for which to generate the predicted depreciation schedule;

accessing via the computer system, from a data repository, forward citation frequency data related to the set of one or more patents, wherein the forward citation frequency data includes frequency of citations of the set of one or more patents by new patents;

generating via the computer system a lognormal probability distribution function for the set of one or more patents based at least partially on the forward citation frequency data for a selected period of time, the lognormal probability distribution function representing ramp up public awareness of the set of one or more patents, wherein the lognormal probability distribution function is iteratively generated to determine coefficients that produce a best fit estimate of the forward citation frequency data;

generating via the computer system an exponential decay function for the set of one or more patents based at least partially on the forward citation frequency data for a second period of time that is beyond the selected period of time, the exponential decay function representing obsolescence of the set of one or more patents, wherein the exponential decay function is iteratively generated to determine coefficients that produce a best fit estimate of the forward citation frequency data; and storing via the computer system the predicted depreciation schedule for the set of one or more patents, the predicted depreciation schedule comprising a combination of the lognormal probability distribution function and the exponential decay function, wherein the predicted depreciation schedule is correlated to a depreciation rate for the set of one or more patents.

6. The method of claim 1, further comprising formulating patent filing and prosecution strategy based at least on the exponential decay function.

7. The method of claim 3, further comprising formulating patent filing and prosecution strategy based at least on the exponential decay function.

8. The method of claim 5, further comprising formulating patent filing and prosecution strategy based at least on the exponential decay function.

* * * * *